United States Patent
Quach et al.

(10) Patent No.: US 7,093,079 B2
(45) Date of Patent: Aug. 15, 2006

(54) SNOOP FILTER BYPASS

(75) Inventors: Tuan M. Quach, Fullerton, CA (US);
Lily Pao Looi, Portland, OR (US); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 10/323,200

(22) Filed: Dec. 17, 2002

(65) Prior Publication Data

US 2004/0117561 A1  Jun. 17, 2004

(51) Int. Cl.
*G06F 12/08* (2006.01)
(52) U.S. Cl. .................... 711/141; 711/146; 711/137
(58) Field of Classification Search ............... 711/133, 711/138, 139, 136, 147, 141, 146, 145; 710/107
See application file for complete search history.

(56) References Cited

U.S. PATENT DOCUMENTS

| | | | | |
|---|---|---|---|---|
| 5,890,216 | A * | 3/1999 | Derrick et al. | 711/138 |
| 5,918,069 | A * | 6/1999 | Matoba | 711/138 |
| 6,463,510 | B1 * | 10/2002 | Jones et al. | 711/138 |
| 6,598,123 | B1 * | 7/2003 | Anderson et al. | 711/133 |
| 6,615,319 | B1 * | 9/2003 | Khare et al. | 711/141 |
| 6,810,467 | B1 * | 10/2004 | Khare et al. | 711/146 |
| 2003/0041212 | A1 | 2/2003 | Creta | |
| 2003/0070016 | A1 * | 4/2003 | Jones et al. | 710/107 |
| 2003/0126372 | A1 * | 7/2003 | Rand | 711/141 |
| 2003/0163649 | A1 * | 8/2003 | Kapur et al. | 711/146 |
| 2004/0003184 | A1 * | 1/2004 | Safranek et al. | 711/146 |

OTHER PUBLICATIONS

Moshovos et al. "JETTY: Filtering Snoops For Reduced Energy Consumption in SMP Servers" HPCA: The Seventh International Symposium on High-Performance Computer Architecture, Jan. 19-24, 2001.*

U.S. Appl. No. 10/046,768, filed Jan. 17, 2002. Title: Pseudo least-recently-used (PLRU) replacement method for a multi-node snoop filter. Inventors: Linda J. Rankin and Kai Cheng. Specification pp. 1-25 including abstract. Drawings 4 sheets; Figures 1, 2, 3 and 4.

U.S. Appl. No. 09/643,382, filed Aug. 21, 2000. Title: Method and apparatus for centralized snoop filtering. Inventors: Manoj Khare, Faye A. Briggs, Kai Cheng and Lily Pao Looi. Specification pp. 1-15 including abstract. Drawings 4 sheets; Figures 1, 2, 3 and 4.

U.S. Appl. No. 09/752,534, filed Dec. 29, 2000. Title: Mechanism for efficiently supporting the full MESI (modified, exclusive, shared, invalid) protocol in a cache coherent multi-node shared memory sytem. Inventors: Manoj Khare, Lily P. Looi, Akhilesh Kumar and Faye A. Briggs. Specification pp. 2-22 including abstract. Drawings 9 sheets; Figures 1, 2, 3, 4, 5, 6, 7, 8, and 9.

(Continued)

*Primary Examiner*—Pierre-Michel Bataille
(74) *Attorney, Agent, or Firm*—Ling Hong

(57) ABSTRACT

Machine-readable media, methods, and apparatus are described for processing coherent requests of a computing device comprising multiple cache nodes. In some embodiments, a coherent switch may receive from a requesting cache node a coherent request for a line of memory. The coherent switch may further issue snoop requests to one or more non-requesting cache nodes based upon whether a snoop filter bypass mode is enabled. In particular, the coherent switch when not in snoop filter bypass mode may obtain coherency data from a snoop filter and may issue snoop requests to zero or more non-requesting cache nodes based upon the coherency data obtained from the snoop filter. Further, the coherent switch when in snoop filter bypass mode may bypass the snoop filter and may issue snoop requests to all non-requesting cache agents.

19 Claims, 4 Drawing Sheets

OTHER PUBLICATIONS

U.S. Appl. No. 10/323,200, filed Dec. 17, 2002. Title: Snoop filter bypass. Inventors: Tuan M. Quach, Lily Pao Looi and Kai Cheng. Specifiction pp. 2-28 including abstract. Drawings 4 sheets; Figures 1, 2, 3 and 4.

Moshovos et al. "Jetty: Filtering Snoops for Reduced Energy Consumption in SMP Servers" HPCA: The seventh International Symposium on High-Performance Computer Architecture, Jan 19-24, 2001.

* cited by examiner

SNOOP FILTER BYPASS

BACKGROUND

Some computing devices comprises multiple caching agents such as processors and/or I/O hubs. The caching agents may comprise internal caches and/or associated external caches that maintain local copies of data stored in system memory of the computing device. These local copies of data are often referred to as cache lines, memory lines, and/or lines and may comprise 64, 128, 256 or some other number of bytes of data. These computing devices further implement some sort of cache coherency protocol which ensures that cache lines remain coherent with one another and the memory.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for bypassing a snoop filter of a coherent switch. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures, gate level circuits and full software instruction sequences have not been shown in detail in order not to obscure the invention.

References in the specification to "one embodiment", "an embodiment", "an example embodiment", etc., indicate that the embodiment described may include a. particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
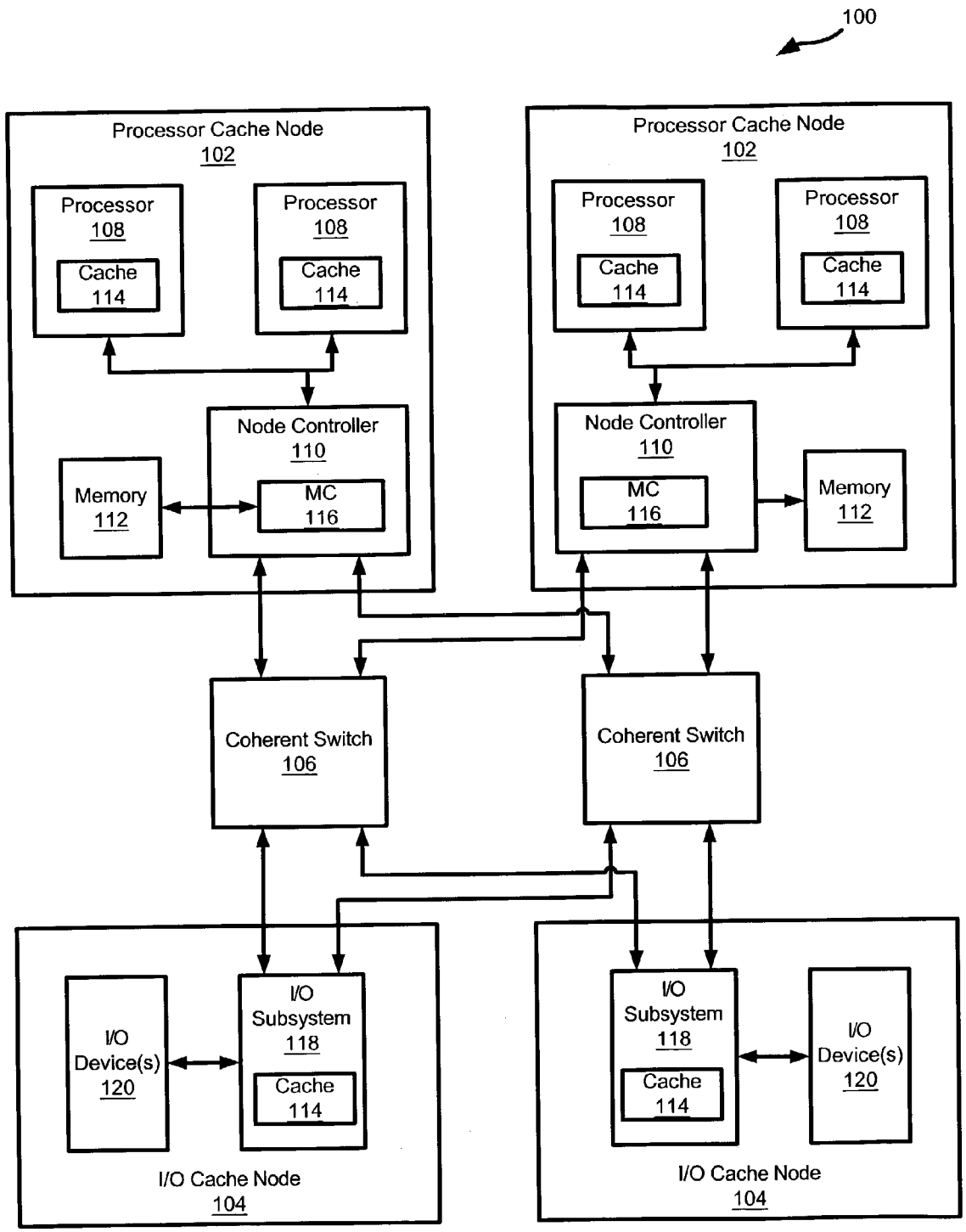
FIG. 1 illustrates an embodiment of a computing device.

Referring now to FIG. 1, an example computing device 100 may comprise one or more processor cache nodes 102, one or more input/output (I/O) cache nodes 104, and one or more coherent switches 106 that interconnect the processor nodes 102 and the I/O cache nodes 104. Each processor cache node 102 may comprise one or more processors 108, a node controller (SNC) 110 and memory 112. The processors 108 may execute code or instructions of the memory 112 and may process data of the memory 112 in response to executing such instructions. Further, the processors 108 may have associated caches 114 in which lines of the memory 112 may be stored and accessed more quickly by the associated processors 108.

The node controllers 110 may each comprise a memory controller 116. The memory controllers 116 may provide the processors 108 and other components of the computing device 100 with access to storage locations of the memory 112. Further, the memory 112 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices. The node controllers 110 may further snoop the caches 114 associated with the processors 108 and/or track snoop cycles of the processor bus. Accordingly, the node controllers 110 may provide the coherent switch 106 with the coherency states of lines in the caches 114 of the processors 108 in response to a snoop request for the line.

Each I/O node 104 may comprise an I/O subsystem 118 and one or more I/O devices 120 Further, each I/O subsystem 118 may comprise one or more I/O hubs, bridges and/or interfaces (not shown) to support data transfers with one or more I/O devices 120 such as, for example, Industry Standard Architecture (ISA) devices, Peripheral Component Interconnect (PCI) devices, PCI-X devices, PCI Express devices, Universal Serial Bus (USB) devices, Advanced Technology Attachment (ATA) devices, Small Computer System Interface (SCSI) devices, InfiniBand devices, etc. The I/O subsystems 118 may have associated caches 114 in which lines of the memory 112 may be stored and accessed more quickly by the associated I/O subsystems 118. Further the I/O subsystems 118 may provide the coherent switch 106 with the coherency state of lines in the their respective caches 114.

The caches 114 may be internal and/or external to the processors 108 and the I/O subsystems 118. Further, each cache 114 may comprise separate cache memories for data and instructions, and the cache memories may be further arranged in a hierarchal manner. For example, the processors 108 may comprise an internal level 1 (L1) data cache, an internal L1 instruction cache, a larger internal level 2 (L2) cache for both data and instruction, and an even larger external level 3 (L3) cache for both data and instructions. Further, the cache 114 may store data and/or instructions in cache lines and may store a tag for each line that associates or maps a particular cache line to a corresponding line of the memory 112. The cache 114 may also store and update a coherency state for each cache line that indicates a coherency state for the cache line. In one embodiment, each cache 114 supports a MESI coherency protocol in which a cache 114 may have a line in a modified (M) state, an exclusive (E) state, a shared (S) state, or an, invalid (I) state. In another embodiment, one or more of the caches 114 such as the caches 114 of the I/O subsystem 118 may support a reduced MESI coherency protocol. For example, a cache 114 may support having a line in a modified/exclusive (M/E) state or a shared/invalid (S/I) state. In yet another embodiment, each cache 114 may support a MOSI coherency protocol in which a cache 114 may have a line in a modified (M) state, an owned (O) state, a shared (S) state, or an invalid (I) state. It should be appreciated that other coherency protocols may also be used without departing from the scope of the present invention.

In accordance with an example MESI coherency protocol, the invalid state indicates that the cache 114 does not have a current copy of the line and that either the memory 112 and/or one of the other caches 114 have the current copy of the line. The shared state indicates that the cache 114 has a current copy of the line and that zero or more other caches 114 may also have a current copy of the line in the shared state. The exclusive state indicates that the cache 114 has obtained ownership of the line and has a current copy of the line. Further, the exclusive state indicates that no other cache 114 has a copy of the line in the modified, exclusive, or shared state. The modified state indicates that the cache has a current copy of the line which may have been modified. Further, like the exclusive state, the modified state indicates that no other cache 114 has a copy of the line in the modified, exclusive, or shared state. In one embodiment, in order to maintain data consistency or coherency, a caching agent such as the processor 108 or the I/O subsystem 118 first obtains an exclusive copy of the line in its associated cache prior to modifying or writing to the line.

Figure 2:
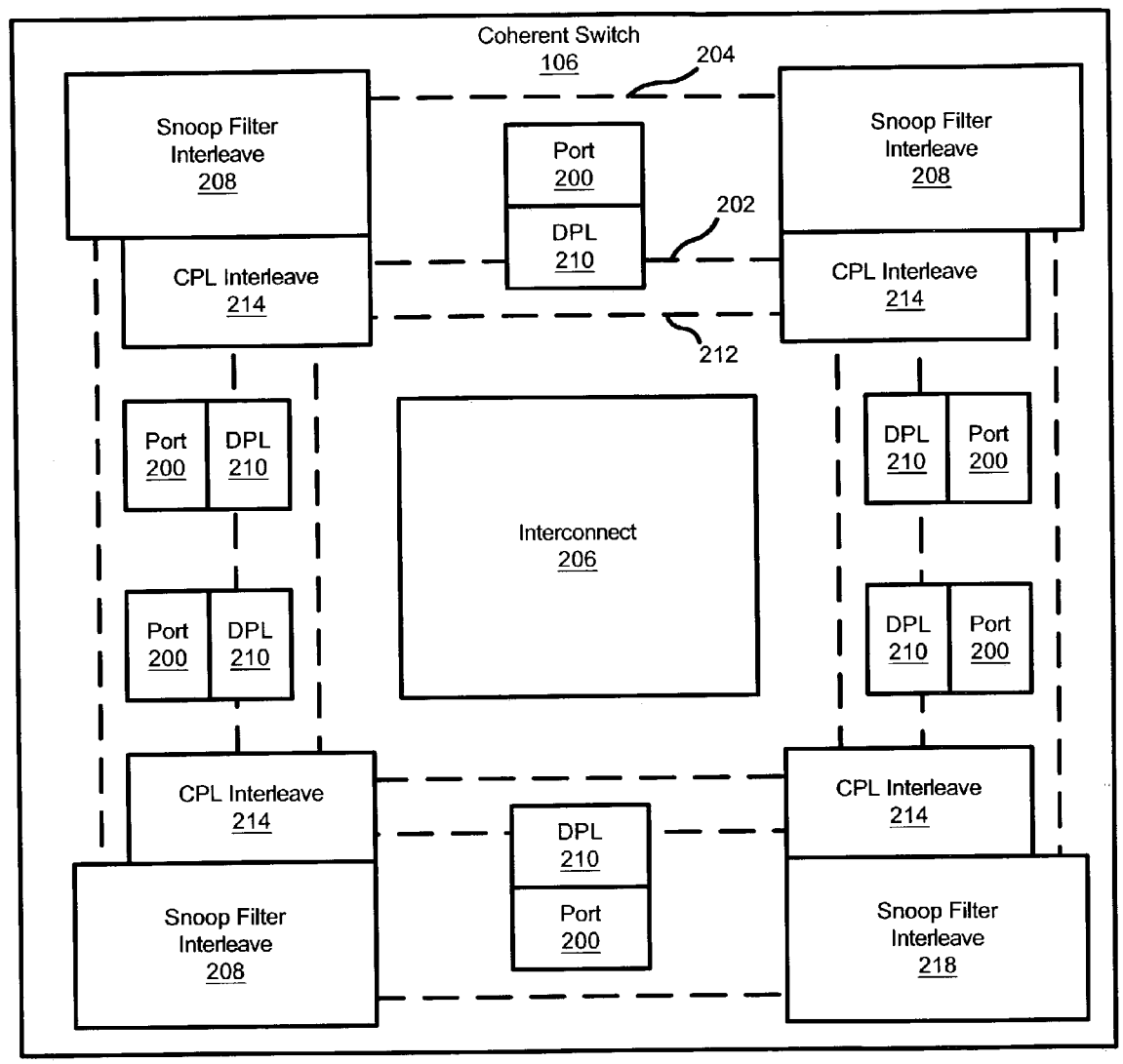
FIG. 2 illustrates an embodiment of a coherent switch of the computing device of FIG. 1.

The coherent switches 106 may couple the processor cache nodes 102 and the I/O cache nodes 104 together and may help maintain data consistency or coherency among the cache nodes 102, 104. As shown in FIG. 2, the coherent switches 106 may comprise ports 200, protocol logic 202, a snoop filter 204, and an interconnect 206. The snoop filter 204 may comprise one or more storage arrays such as, for example, a fully associative array, set associative array, or a directly mapped array that comprise ways or lines to store coherency data. In one embodiment, the snoop filter 204 comprises a 12-way set associative array in which each way may store an address tag, a coherency state, and a presence vector for a line. The address tag may comprise all or a portion of the line's memory address in order to map or associate the coherency state and the presence vector of the way to a particular line of the memory 112. The coherency state may indicate a coherency state (e.g. M, E, S, or I) of the line in the caches 114, and the presence vector may indicate which cache nodes 102, 104 of the computing device 100 have the line in their respective caches 114.

In one embodiment, the snoop filter 204 may support coherency states of shared (S) and exclusive/modified (E/M) which represent the collective state of the line in the caches 114. However, the snoop filter 204 may alternatively maintain separate coherency states for each cache node 102, 104 and/or cache 114 of the computing device 100. In one embodiment, the snoop filter 204 may contain an E/M state for a line if any cache 114 contains or may contain the line in the exclusive state or the modified state, and the snoop filter 204 may contain a presence vector for the line that identifies the one cache node 102, 104 of the computing device 100 that might have the line in the exclusive or modified state. Further, the snoop filter 204 may contain an S state for a line if any cache 114 contains or may contain the line in the shared state, and the snoop filter 204 may contain a presence vector for the line that identifies the one or more cache nodes 102, 104 of the computing device 100 that might have the line in the shared state. The snoop filter 204 may indicate a line as having an invalid state by updating the presence vector for the line to identify no cache node 102, 104 has a copy of the line in the S or E/M state. In one embodiment, the states of the snoop filter 204 may not exactly correspond with the states of the caches 114 due to for example a processor changing the state of a line in its cache 114 without generating external signals to indicate the change. However, the coherency protocol of such an embodiment may be designed for such incomplete information and may still maintain data coherency despite the unobservable change in coherency state for the line.

In one embodiment, the snoop filter 204 may be divided into four snoop filter (SF) interleaves 208. While in one embodiment the snoop filter 204 maintains coherency data for all lines of the caches 114, each SF interleave 208 may maintain coherency data for a unique subset of the cache lines. For example, two bits of a line's memory address may be used to identify which of the SF interleaves 208 maintains the coherency data for the particular line. Further, by assigning unique subsets to each of the SF interleaves 208, the SF interleaves 208 may operate in parallel and may increase the overall performance of the coherent switch 106 in comparison to a non-interleaved snoop filter 204 that may process a single request at time.

The coherent switch 106 may comprise multiple ports 200 that may each be coupled to a separate cache node 102, 104. In one embodiment, the coherent switch 106 comprises six ports 200 which enables coupling the coherent switch 106 to up to six cache nodes 102, 104; however, other embodiments may comprise a different number of ports 200 in order to support more or fewer cache nodes 102, 104. The ports 200 may comprise receivers, transmitters, phase-lock loops, etc. to provide a physical interface for transaction transfers. In one embodiment, the ports 200 may provide a bidirectional serial interconnect to transfer packetized transactions.

The protocol logic 202 may service transactions such as, for example, requests and responses received from the cache nodes 102, 104 and may issue transactions to the cache nodes 102, 104. In particular, the protocol logic 202 may decode transactions, may handle conflicts, may interface with the snoop filter 204, and may process transactions. In one embodiment, the protocol logic 202 may comprise distributed protocol logic (DPL) 210 and centralized protocol logic (CPL) 212. In one embodiment, each port 200 has an associated DPL 210 to locally implement portions of the protocol logic 202 for the respective port 200. In particular, the DPL 210 may comprise decode logic to decode incoming transactions and may comprise one or more buffers or queues to store data and/or other information associated with incoming and outgoing transactions while being processed by the protocol logic 202 and/or awaiting responses from cache nodes 102, 104.

The CPL 212 may provide global functions for processing transactions regardless of which port 200 the transaction originated. For example, the CPL 212 for each port 200 may check for-transaction conflicts, may prevent transaction starvation, and may maintain data coherency in accordance with a snoop-based protocol. In particular, the CPL 212 in response to processing a read, snoop, or invalidate request may check the state of the line of the request in the caches 114 and may issue requests to one or more cache nodes 102, 104 based upon the state of the line. In one embodiment, the CPL 212 may use the coherency data of the snoop filter 204 to reduce the number of requests sent to the cache nodes 102, 104 and may update coherency data in the snoop filter 204 based upon the transaction type and snoop responses received from the cache nodes 102, 104. The CPL 212 may further comprise logic to bypass the snoop filter 204 and to maintain data coherency without using the coherency data of the snoop filter 204. Moreover, the CPL 212 may be divided into four interleaves 214, and a separate CPL interleave 214 may be associated with each of the four SF interleaves 208.

The interconnect 206 may route requests and responses between the DPL 210 and the CPL interleaves 214 of the protocol logic 202. Further, the interconnect 206 may route requests and responses between the ports 200. In one embodiment, the interconnect 206 comprises a crossbar switch that may route transactions of any one port 200 to any other port 200 of the coherent. switch 106. Further, the interconnect 206 of one embodiment comprises one or more bypass buses for routing transactions between the DPL 210 and the CPL interleaves 214 while bypassing the crossbar switch. The bypass buses may provide a quicker path between the DPL 210 and the CPL interleaves 212 and may lessen the amount of traffic on the crossbar switch than would otherwise exist.

Figure 3:
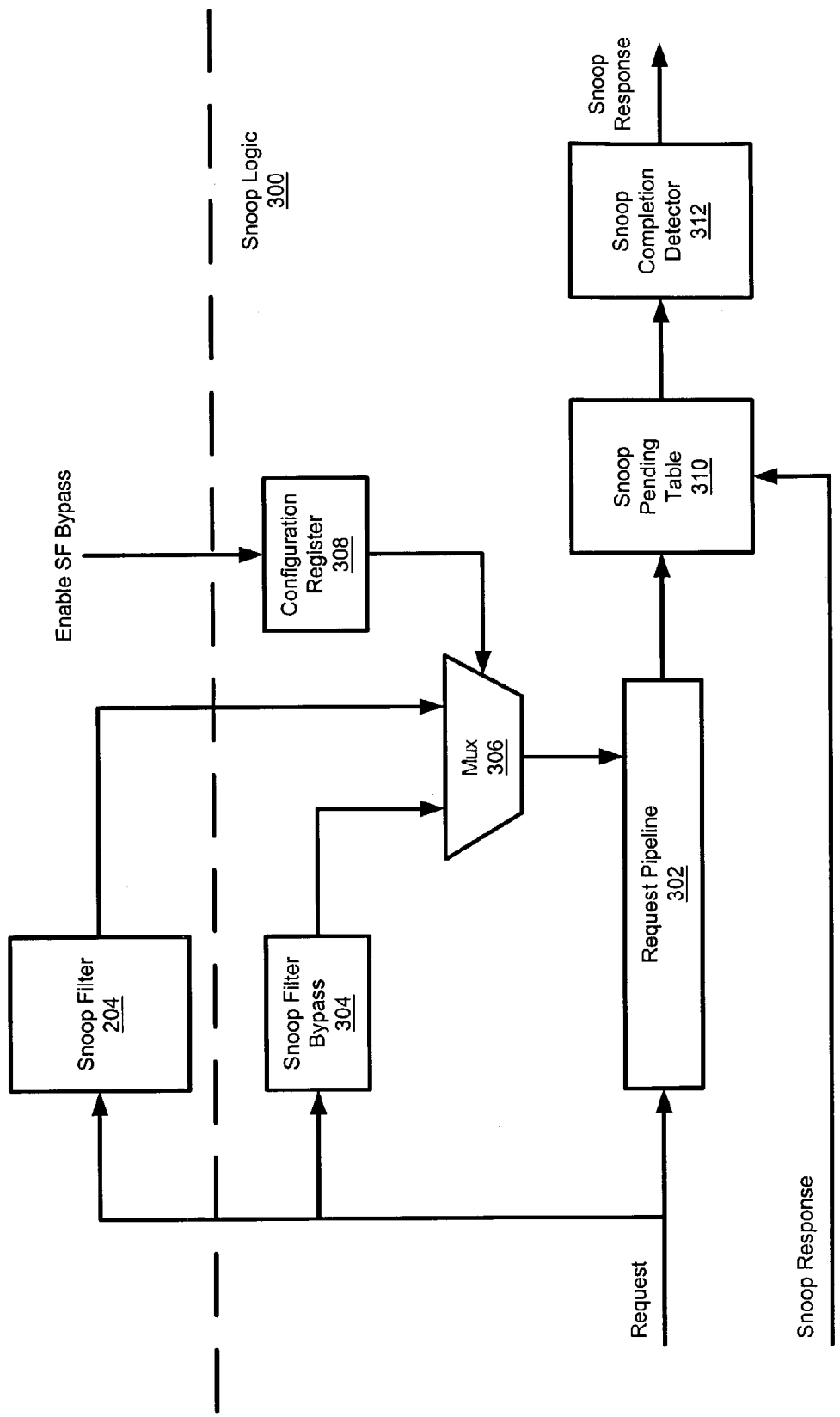
FIG. 3 illustrates an embodiment of snoop logic of the coherent switch of FIG. 2.

In FIG. 3, snoop logic 300 of the protocol logic 202 is shown. The snoop logic 300 may comprise a request buffer or pipeline 302, a snoop filter (SF) bypass 304, a multiplexer 306, and a one or more configuration registers 308. The one or more configuration registers 308 may enable or disable a snoop filter (SF) bypass mode in which the protocol logic 202 bypasses the snoop filter 204 and issues snoop requests to the cache nodes 102, 104 based upon coherency data obtained from the SF bypass 304. A processor 108 may enable the SF bypass mode by writing an appropriate value to the configuration register 308 that sets a SF bypass bit of the configuration register 308. However, it should be appreciated that the coherent switch 106 may support alternative and/or additional mechanisms for activating the SF bypass mode. For example, the coherent switch 106 may activate the SF bypass mode in response to receiving a request, message, or transaction from one of the cache nodes 102, 104. Further, the coherent switch may activate the SF bypass mode in response to determining that the snoop filter 204 of the coherent switches 106 is not large enough to track all caches 114 of the computing device 100.

The request pipeline 302 may comprise storage for one or more requests as coherency data is obtained from the snoop filter 204 or the SF bypass 304. In one embodiment, the protocol logic 202 may store a request at the tail of the request pipeline 302 and may request the snoop filter 204 and the SF bypass 304 to provide coherency data for the request. The snoop filter 204 may use the memory address of the request to lookup the coherency data for the line of the request, and may provide the multiplexer 306 with the coherency data for the line within a predetermined time such as, for example, three (3) clock cycles. Similarly, the SF bypass 304 may provide the multiplexer 306 with coherency data for the line. However, the SF bypass 304 regardless of the actual state of the line in the cache nodes 102, 104 may provide coherency data that causes the protocol logic 202 to snoop all cache nodes 102, 104 of the computing device 100 except for the cache node 102, 104 from which the request originated. In one embodiment, the SF bypass 304 may provide an E/M state for the line and a presence vector that indicates that all cache nodes 102, 104 except for the requesting cache node 102, 104 have the line present in their respective caches 114. Such coherency data in one embodiment effectively indicates that the protocol logic 202 does not know the state of the line in the non-requesting cache nodes 102, 104 and therefore the non-requesting cache nodes 102, 104 should be snooped to obtain the state of the line and maintain data coherency. It should be appreciated that coherency data provided by the SF bypass 304 may not accurately reflect the actual coherency state of the line in the caches 114. For example, in one embodiment, the SF bypass 304 provides coherency data that indicates that all cache nodes have the line in a modified state despite the coherency protocol of the embodiment ensuring that no more than one cache node 102, 104 actually has a line in a modified state.

The snoop completion detector 312 may determine based upon data of the snoop pending table 310 whether a final snoop response may be obtained for a transaction. In one embodiment, the snoop completion detector 312 may determine that a final snoop response may be obtained if the snoop pending table 310 indicates that all snoop requests associated with the transaction have completed (e.g. no snoop requests still in pending state). In another embodiment, the snoop completion detector 312 may determine that the final snoop response has been obtained prior to the snoop pending table 310 indicating that all snoop requests associated with the transaction have completed. For example, in one embodiment, the coherency protocol requires that a line modified in one cache node 102, 104 be in the invalid state in all other cache nodes 102, 104. Accordingly, if the snoop pending table 310 indicates a modified state for one of the cache nodes 102, 104, the snoop completion detector 312 may determine that the final snoop response for the transaction is the modified snoop response even if other snoop requests have yet to complete since the other cache nodes should have the line in the invalid state.

Figure 4:
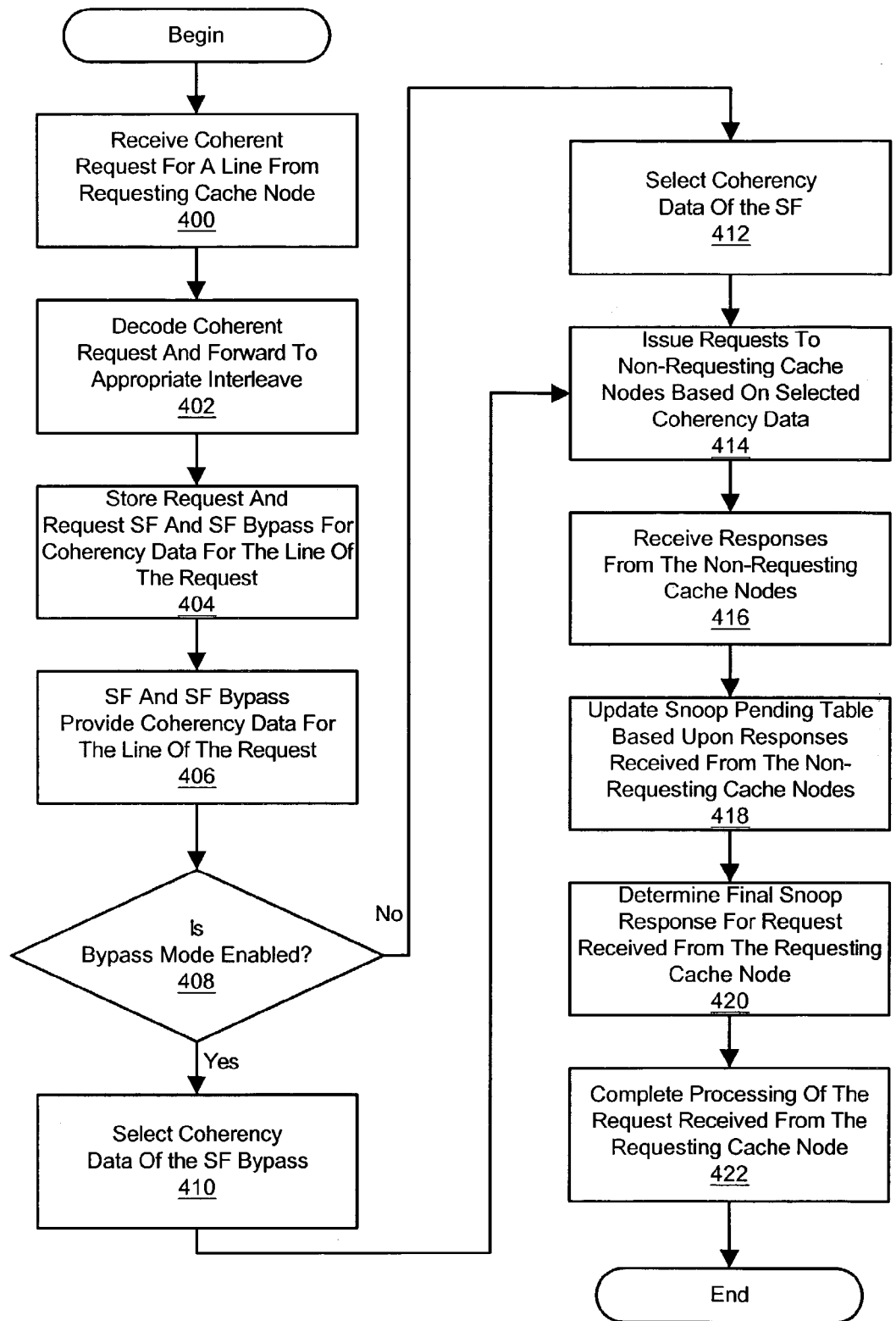
FIG. 4 illustrates an embodiment of a method that may be used by the coherent switch of FIG. 2 to process requests.

An example method is shown in FIG. 4 that may be used by the coherent switches 106 to process a coherent request. In one embodiment, a coherent request involves obtaining a memory line and/or altering the coherency state of a memory line. Accordingly, a coherent request may comprise, for example, a read line request, a write line request, a snoop line request, an invalidate line request, etc. Further, the following description may use the terms "requesting cache node", "requesting port", "non-requesting cache node", "non-requesting port", "home cache node", "home port", "remote cache node", and "remote port". The requesting cache node refers to the cache node 102, 104 that issued a coherent request to the coherent switch 106, and the requesting port refers to the port 200 of the coherent switch 106 that received the request from the requesting cache node. Further, a non-requesting cache node refers to a cache node 102, 104 other than the requesting cache node, and a non-requesting port refers to a port 200 of the coherent switch 106 other than the requesting port. A home cache node refers to the cache node 102, 104 that comprises the memory 112 used to store the line of the coherent request and the home port refers to the port 200 of the coherent switch 106 for communicating with the home cache node. Furthermore, a remote cache node refers to a cache node 102, 104 other than a home cache node and a requesting cache node, and a remote port refers to a port 200 of the coherent switch 106 other than the home port and the requesting port.

In block 400, a requesting cache node 102, 104 may issue a coherent request and a receiving port 200 of the coherent switch 106 may receive the coherent request from the requesting cache node 102, 104. The DPL 210 associated with the receiving port 200 may decode the received coherent request and may forward the coherent request to the CPL interleave 214 and snoop filter interleave 208 for tracking coherency data for the memory line of the request (block 402).

In block 404, the CPL interleave 214 may store the coherent request in the request pipeline 302 and may request the snoop filter 204 and/or the SF bypass 304 to provide coherency data for the memory line of the request. The snoop filter 204 and the SF bypass 304 in block 406 may provide the multiplexer 306 with coherency data for the memory line. In block 408, the multiplexer 306 may determine whether the coherent switch 106 is operating in the bypass mode based upon the state of the configuration register 308. In particular, the multiplexer 306, in response to determining that the coherent switch 1 06 is operating in the bypass mode, may select the coherency data received from the SF bypass 304 and may provide the selected bypass data to the request pipeline 302 (block 410). Conversely, the multiplexer 306, in response to determining that the coherent switch 106 is not operating in the bypass mode, may select the coherency data received from the snoop filter 204 and may provide the selected snoop filter data to the request pipeline 302 (block 412).

The CPL interleave 214 in block 414 may issue requests to one or more non-requesting cache nodes 102, 104 via the non-requesting ports 200. In particular, the CPL interleave 214 may determine to which non-requesting cache nodes 102, 104 to send requests and the type or requests to send based upon the coherency data obtained for the coherent request and the request type. In one embodiment, the CPL interleave 214 in response to processing a read invalidate line request in bypass mode may issue a snoop invalidate line request to each remote cache node 102, 104 and may issue a read invalidate line to the home cache node 102, 104 because the coherency data supplied by the SF bypass 304 basically indicates that the state of the line in the non-requesting cache nodes is unknown. However, the CPL interleave 214 in non-bypass mode may issue fewer requests due to the snoop filter 204 already providing sufficient coherency data for some if not all of the non-requesting cache nodes 102, 104. For example, in response to the presence vector of the coherency data indicating that the line is not present in any of the non-requesting cache nodes 102, 104, the CPL interleave 214 may issue a read request to the home cache node 102, 104 to obtain the line from the memory 112 without issuing requests to any of the remote cache nodes 102.

In block 416, the ports 200 of the coherent switch 106 may receive responses from the non-requesting cache nodes 102, 104. In particular, the ports 200 may receive snoop responses or coherency state information for the line of the originating request and may receive a current copy of the line from the memory 112 of the home cache node or a cache 114 of the remote cache node 102, 104. The DPL 210 associated with the non-requesting ports 200 may forward the snoop responses to the CPL interleave 214 for further processing and may forward a current copy of the line to the DPL 210 associated with the requesting cache node and the DPL 210 associated with the home cache node. For example, one of the non-requesting cache nodes 102, 104 may have modified the line and may provide its associated non-requesting port 200 with the modified line. The DPL 210 associated with the port 200 that received the modified line may forward the modified line to the DPL 210 of the requesting port 200 for delivery to the requesting cache node and may forward the modified line to the DPL 210 of the home port 200 for writing the modified line to the memory 112 of the home cache node 102, 104.

The CPL interleave 214 in block 418 may update the snoop pending table 310 with the received snoop response and may update the associated snoop request to a complete or not pending state. In block 420, the-snoop completion detector 312 may determine whether a final snoop response may be determined. In one embodiment, due to the coherency protocol used and the coherency data and presence vector of the snoop filter 204, the coherent switch 106 receives only one type of snoop response in response to the issued snoop requests. In particular all snoop responses received by the coherent request 106 for an originating request are invalid snoop responses, shared snoop responses, modified/shared snoop responses, or modified snoop responses. Accordingly, the snoop completion detector 312 in the non-bypass mode may determine the final snoop response after receiving a snoop response from a single non-requesting cache node. However, in one embodiment, the coherent switch 106 may receive multiple types of snoop responses from the non-requesting cache nodes when in bypass-mode. Accordingly, the snoop completion detector 312 in one embodiment may simply determine the final snoop response after all snoop requests for the originating request have completed. In another embodiment, the snoop completion detector 312 may determine the final snoop response after receiving only a subset of the snoop responses for the issued snoop requests. For example, in one embodiment, the coherency protocol ensures that if one cache node has the line in the modified state, the other cache nodes should have the line in the invalid state. Accordingly, the snoop completion detector 312 may determine that the final snoop response is a modified snoop response after the CPL interleave 214 has received a modified snoop response and prior to receiving all the invalid snoop responses from the other non-requesting cache nodes.

In block 422, the coherent switch 106 may complete the request. In particular, the DPL 210 associated with the requesting port 200 may provide the requesting cache node 102, 104 with the final snoop response and the requested line. Further, if the line was modified, the DPL 210 associated with the home cache node 102, 104 may write the modified line back to the memory 112 of the home cache node 102, 104

The computing device 100 and/or the coherent switch 106 may perform all or a subset of the methods shown in FIG. 4 in response to executing instructions of a machine readable medium such as, for example, read only memory (ROM); random access memory (RAM); magnetic disk storage media; optical storage media; flash memory devices; and/or electrical, optical, acoustical or other form of propagated signals such as, for example, carrier waves, infrared signals, digital signals, analog signals. Furthermore, while the method of FIG. 4 is illustrated as a sequence of operations, the computing device 100 and/or coherent switch 106 in some embodiments may perform illustrated operations of the method in parallel or in a different order.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   receiving a coherent request for a memory line from a requesting cache node of a computing device, and
   selectively requesting non-requesting cache nodes of the computing device to provide their coherency state for the memory line based upon coherency data from a snoop filter bypass in response to a bypass mode being enabled and based upon coherency data from a snoop filter in response to the bypass mode being disabled.

2. The method of claim 1 further comprising
   obtaining coherency data for the memory line from a snoop filter bypass that indicates coherency states are to be requested from all non-requesting cache nodes of the computing device, and
   in response to the bypass mode being enabled, requesting based upon the coherency data of the snoop filter bypass that all the non-requesting cache nodes provide their coherency state for the memory line.

3. The method of claim 1 further comprising obtaining coherency data for the memory line from the snoop filter that indicates a coherency state for the memory line in the cache nodes of the computing device, and
   in response to the bypass mode being disabled, requesting based upon the coherency data of the snoop filter that zero or more cache nodes provide their coherency state for the memory line.

4. The method of claim 1 further comprising
   obtaining coherency data for the memory line from the snoop filter bypass that indicates all non-requesting cache nodes have the memory line in a modified state, and
   in response to the bypass mode being enabled, requesting based upon the coherency data obtained from the snoop filter bypass that the cache nodes provide the memory line and their coherency state for the memory line.

5. An apparatus comprising
   a plurality of ports to receive a request from a requesting cache node that involves a memory line and to issue requests to non-requesting cache nodes,
   a snoop filter to maintain coherency data for the memory line,
   a snoop filter bypass to provide coherency data that involves all non-requesting cache nodes,
   protocol logic to issue requests that snoop the memory line in the non-requesting cache nodes selected based upon the coherency data that the snoop filter maintains for the memory line when a bypass mode is disabled and based upon the coherency data of the snoop filter bypass when the bypass mode is enabled.

6. The apparatus of claim 5, wherein
   the protocol logic issues requests that snoop the memory line in zero or more non-requesting cache nodes based upon the coherency data that the snoop filter has for the memory line when the bypass mode is disabled.

7. The apparatus of claim 5, wherein the snoop filter bypass to provide coherency data that indicates all non-requesting cache nodes are to be snooped, and
   in response to the coherency data of the snoop filter bypass and the bypass mode being enabled, the protocol logic issues requests that snoop the memory line in all the non-requesting cache nodes.

8. The apparatus of claim 5, wherein the snoop filter bypass to provide coherency data that indicates all non-requesting cache nodes have the memory line in a modified state, wherein
   in response to the coherency data of the snoop filter and the bypass mode being enabled, the protocol logic issues requests that snoop the memory line in all the non-requesting cache nodes.

9. The apparatus of claim 5, wherein the snoop filter bypass to provide coherency data for the memory line that comprises a modified coherency state and a presence vector indicating that the memory line is present in all non-requesting cache nodes, wherein
   in response to the coherency data of the snoop filter bypass and the bypass mode being enabled, the protocol logic issues requests that snoop the memory line in all the non-requesting cache nodes and that obtain a current copy of the memory line from the non-requesting cache nodes.

10. The apparatus of claim 5, further comprising
    a multiplexer to provide the protocol logic with the coherency data of the snoop filter in response to the bypass mode being disabled, and to provide the protocol logic with the coherency data of the snoop filter bypass in response to the bypass mode being enabled.

11. A computing device comprising
    volatile memory to store lines of data,
    a first cache node to issue a request that involves a line of the volatile memory, the requesting cache node comprising a first cache to store the lines of the memory,
    a plurality of second cache nodes each comprising a second cache to store lines of the memory, and
    a coherent switch to receive a request for a line of the memory from the first cache node, and to determine a coherency state of the line in the plurality of second cache nodes based upon coherency data of a snoop filter when a bypass mode is disabled and based upon coherency data of a snoop filter bypass when the bypass mode is enabled.

12. The computing device of claim 11, wherein the coherency switch issues requests that result in all second cache nodes providing their coherency state for the line when the bypass mode is enabled.

13. The computing device of claim 11, wherein the coherency switch determines the coherency state of the line in a subset of second cache nodes based upon coherency data of a snoop filter when the bypass mode is disabled and determines the coherency state of the line in all of second cache nodes based upon coherency data of a snoop filter bypass when the bypass mode is enabled.

14. The computing device of claim 11, wherein the coherency data of the snoop filter bypass results in the coherency switch requesting that a subset of the second cache nodes provide their coherency state for the line when the bypass mode is disabled.

15. A tangible machine-readable medium comprising a plurality of instructions which when executed result in an apparatus
    issuing requests to all non-requesting cache nodes that result in the all non-requesting cache nodes providing their coherency state for a line of memory when in a bypass mode,
    issuing requests to zero or more non-requesting cache nodes that result in the zero or more non-requesting cache nodes providing their coherency state for the line when not in the bypass mode.

16. The machine-readable medium of claim 15 wherein the plurality of instructions further result in the apparatus
    determining a coherency state response for the line based upon the coherency states received from the non-requesting cache nodes, and
    providing a requesting cache node with the coherency state response for the line.

17. The machine-readable medium of claim 16 wherein the plurality of instructions further result in the apparatus issuing one or more requests to the non-requesting cache nodes for a current copy of the line.

18. The machine-readable medium of claim 17 wherein the plurality of instruction further result in the apparatus providing a requesting cache node with the current copy of the line.

19. The machine-readable medium of claim 18 wherein the plurality of instructions further result in the apparatus writing the current copy of the line to the memory.

* * * * *